United States Patent Office 3,180,667
Patented Apr. 27, 1965

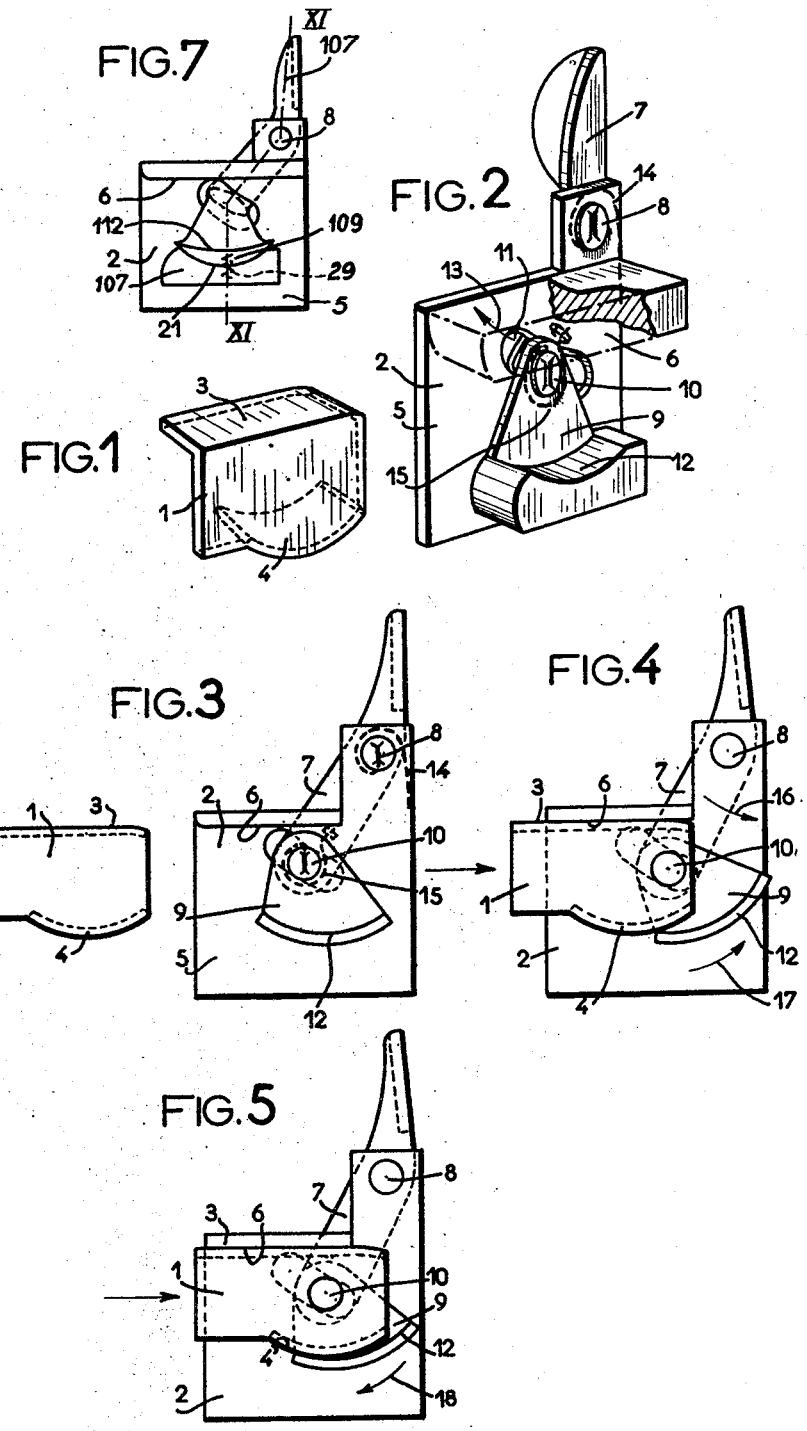

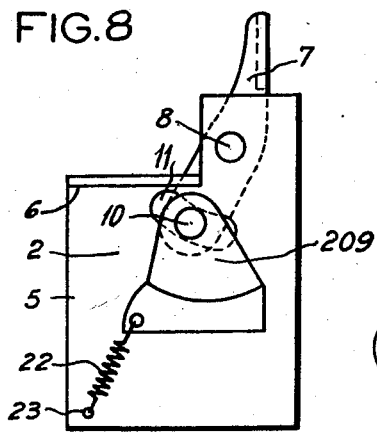
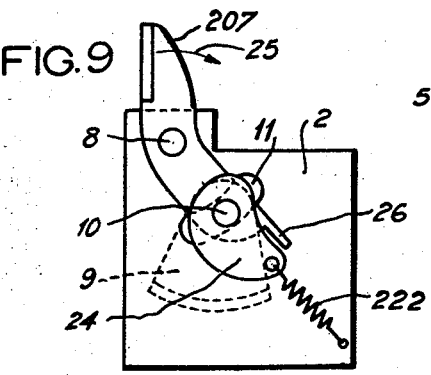
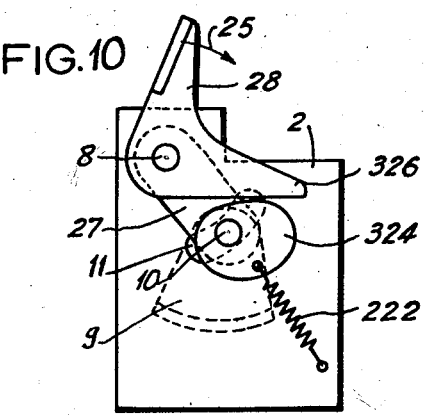
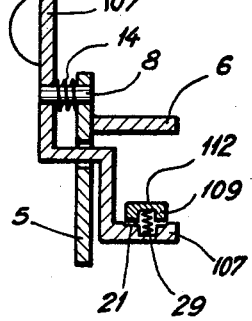
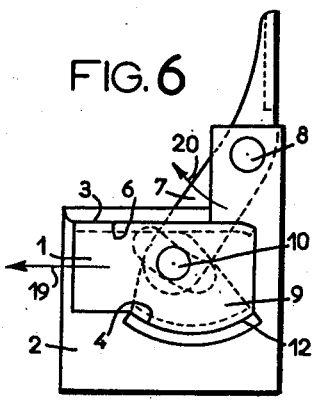

3,180,667
JUNCTION, IN PARTICULAR A LOCK, WITH A MOVING ROCKING-LEVER
Albert Max Auboin, 23 Ave. Foch, Paris, France, and René Fernand Victor Girard, 10 Allee des Platanes, Antony-Est, France
Filed Dec. 29, 1961, Ser. No. 163,177
Claims priority, application France, Jan. 4, 1961, 848,792, Patent 1,284,652
8 Claims. (Cl. 292—200)

The present invention relates to a junction between two devices of any kind, the term "junction" being taken in its wildest sense to be inclusive of for example, anchorages, towing devices, locking systems, closures of any type, and couplings between two units. The invention is applicable in particular to locks which it has the object of improving.

The invention has for an object to provide a junction, in particular a lock, which cannot in any case be opened inopportunely. A lock of this kind is especially desirable in automobile construction to avoid opening of the door lock during a crash and thereby prevent possible ejection of the passengers through an open door.

The invention has also for another object to provide a junction, in particular a lock, which locks itself in the closed position, and the locking of which becomes increasingly stronger as the two parts of the lock are subjected to greater forces tending to separate them.

The invention has further for an object to provide a junction, in particular a lock, the operation of which is effected by very small and practically negligible effort.

The invention has again for another object to provide a junction, in particular a lock, the operation of which is noiseless.

The junction according to the invention is composed of two parts, a male part and a female part, each part carried by one of the two members which the junction is intended to join together, and the male part is provided with a convex side which fits at the moment of engagement into the concave portion of a rocking lever carried by a lever of the female part; this fitting produces the locking action which is removed for disengagement by acting on this lever.

The invention will be described with reference to the accompanying drawings given by way of examples only and without implied limitation. In these drawings:

FIG. 1 is a perspective view of the male portion of the junction;

FIG. 2 is a perspective view of the female portion of the junction;

FIGS. 3, 4, 5 and 6 show diagrammatically the operation of the junction according to the invention, the junction being shown open in FIG. 3, at the beginning of its closure in FIG. 4, just at the moment of locking in FIG. 5, and closed in FIG. 6;

FIG. 7 shows another embodiment of the rocking lever of the female portion;

FIG. 8 shows a further embodiment employing elastic restoring means for the rocking lever;

FIG. 9 shows a further embodiment of the lever of the female portion;

FIG. 10 shows still another embodiment of the lever; and

FIG. 11 is a cross-sectional view taken along line XI—XI of FIG. 7.

The junction according to the invention will be described with reference to FIGS. 1 and 2, given by way of non-limitative example. The junction comprises a male portion 1 (FIG. 1) and a female portion 2 (FIG. 2), each carried by one of the two units to be joined. The male portion 1 comprises, for example on its upper face, a flat side 3 and on its opposite face a convex side 4, for example circular and having a radius R. The female portion 2 comprises a casing 5 with an internal flat side 6, a lever 7 pivoted at 8 on the casing 5, and a rocking lever 9 pivoted at 10 on the lever 7, the pivot 10 passing into an appropriate cut-out portion 11 of the casing 5 and the rocking lever 9 being provided with a concave side 12 adapted to accommodate the convex side 4 of the male portion 1, the concave side 12 being also circular for example and having the radius R. With respect to the pivot 8, the pivot 10 is located on the entry side of the female portion 2, so that the movement of the lever 7 in the direction of the arrow 13 brings the rocking lever 9 towards the side 6. This movement of the lever 7 is produced by a spring 14, which may be for example concentric with the pivot 8. The movement of lever 7 is limited by a stop which may for example be constituted by the edge of the cut-out portion 11. A spring 15, concentric with the pivot 10 for example, returns the rocking lever 9 with respect to the lever 7 into its mean position, as shown in FIG. 2.

The operation of the junction according to FIGS. 1 and 2 will be described with reference to the diagrammatic illustration in FIGURES 3 to 6. FIG. 3 shows the junction when the male portion is presented in front of the female portion; the same parts have been given the same reference numbers. The male portion which engages in the female portion as in FIG. 4, causes the flat portions 3 and 6 to slide one on the other, while the convex side 4 pushes back the rocking lever 9, which produces rotation of the lever 7 in the direction of the arrow 16 and of the rocking lever 9 in the direction of the arrow 17. For a sufficient degree of penetration (FIG. 5), the sides 4 and 12 slide one on the other, and under the action of its spring 15, the rocking lever returns towards its mean position in the direction of the arrow 18. The junction is then assembled (FIG. 6), the sides 4 and 12 being engaged one on the other.

FIG. 6 shows clearly that a tractive effort of separation (arrow 19) would tend to cause the lever 7 to rotate in the direction of the arrow 20, and in consequence would only increase the locking action of the male portion in the female portion. The locking of the male portion in the female portion of the junction according to the invention thus becomes more powerful when the two portions have to withstand a greater effort which tends to separate them.

In order to open the junction, it is only necessary to operate the lever 7 in the direction opposite to the arrow 20 (FIG. 6), which lowers the rocking lever 9 and releases the male portion 1.

The junction according to the invention has the advantage that it eliminates the usual pawl mechanism and in consequence suppresses the noise from this source. In the same way, the displacements of the parts are tangential movements which are thus effected noiselessly. With regard to the placing of the rocking lever in its assembly position, this can be made completely silent by the use of appropriate materials, such as certain plastic materials.

In the case of automobile locks, a considerable advantage is the impossibility of accidental re-opening, even in the case of a shock deforming the door and/or bodywork (which would ordinarily be enough to eject the passengers); in this case, there cannot be any untimely re-opening otherwise than due to breakage of a part.

A still further advantage of the junction according to the invention is that it can be operated by very small and practically negligible effort, in particular in the case of automobile doors.

It has been stated that the convex side 4 of the male portion 1 and the concave side 12 of the rocking lever 9 may be circular with a radius R. In this case, the centres of these circles (FIG. 6) are coincident in the assembled position of the junction, and are preferably located on the line of the pivots 8 of the lever 7 and 10 of the rocking lever 9. Preferably also, this common center will be located, with respect to the pivot 10 of the rocking lever 9, on the side of the pivot 8 of the lever 7.

A further application of the invention is also described with reference to FIGS. 7 and 11, again given by way of non-limitative example. In this embodiment, a lever 107 of appropriate shape passes through the cut-out portion of the casing 5. A rocking lever 109 is able to oscillate by sliding in a slideway 21 formed by a cut-out portion of the lever 107. A concave side 112 of a shape complementary to that of the convex side 4 is located at the upper portion of the rocking lever 109. A spring 29 connecting the lever 107 and the rocking lever 109 restores the latter to a mean position in the cut-out when the male and female members are engaged with each other.

A further embodiment of the invention is also described with reference to FIG. 8, again given by way of non-limitative example. The two springs 14 and 15 are eliminated and are replaced by a single spring 22, acting directly on the rocking lever 209, and indirectly on the lever 7, while tending to align their pivots 8 and 10 with the point of attachment 23 of the spring 22 on the casing 5 of the female portion 2.

Still another embodiment of the invention is described with reference to FIG. 9, given by way of example and without limitation. The lever 207 is provided with a cam 24 rigidly fixed to the rocking lever 9. The manual action on the lever 207 to separate the junction (arrow 25) positively drives the rocking lever 9 by co-operation of the tail 26 of the lever 207 with the side of the cam 24, thus ensuring the opening of the junction in spite of friction, and even if there exists a tractive force between the male and female portions.

Still a further embodiment of the invention will be described with reference to FIG. 10, given by way of example without limitation. The lever 7 is replaced by a shorter lever 27, pivoted at 8 and carrying at 10 the cam 324 and the rocking lever 9. In addition, a push-rod 28, pivoted at 8, is provided with a tail 326 which co-operates with the cam 324.

It is clear that the junction according to the invention can be improved by means known per se, such for example as indicating or control contacts for the brake in the case of automobile trailers.

What we claim is:

1. A lock comprising a slidable male member and an accommodating female member adapted to receive and hold the male member in locked position, said male and female members having corresponding engageable curved surfaces of substantially identical shape, said female member including a casing, a pivotally supported lever on said casing, a pivot supported on the lever, said casing being provided with a cutout through which said pivot passes with clearance for being moved to limit positions in said cut-out, a rocking lever on which is provided said curved surface of the female member, said rocking lever being pivotally supported on said pivot, elastic means urging said levers to a neutral position, said male and female members having respective slidably engageable surfaces located in spaced relation from the associated curved surfaces, said male member causing pivotal movement of both said levers as the male member is slid into engagement with the female member along the slidable engageable surfaces thereof after which engagement the elastic means returns the levers to the original position thereof, said levers resisting sliding of the male member and thereby disengagement of said members, said members being released upon pivotal movement of the first said lever.

2. A lock as claimed in claim 1 wherein said cut-out is inclined with respect to the direction of sliding of the male member and the pivot supporting the first said lever is located further from the male member than is the second pivot.

3. A junction between two members comprising a male part and a female part, each part being adapted for being carried by a respective one of the two members, the male part including a convex side and the female part including a rocking lever, a pivotally supported lever supporting said rocking lever, said rocking lever including a concave side corresponding in shape to the convex side of the male member for accommodating the same and elastic restoring means for said lever and said rocking lever urging the same to a normal position, said convex and concave sides being respectively positioned for being fitted together to close said junction, said junction being openable by pivotally moving the lever, the male part including a flat side opposite said convex side, the female part comprising a casing, said casing including a flat internal side opposite the concave side of said rocking lever, said casing including a pivot supporting said lever, a further pivot on the said lever pivotally supporting the rocking lever, said casing being provided with a cut-out through which passes said further pivot, said elastic means comprising a spring urging said lever into contact with said casing at said cut-out therein, and a second spring urging said rocking lever to a mean position with respect to the said lever, said further pivot for the rocking lever which is on said first mentioned lever being placed closer to the male part than is the pivot of the lever on said casing.

4. A junction as claimed in claim 3, in which said convex and concave sides are circular and have the same radius, the latter said sides having coincident centers with the convex and concave sides engaged, which coincident centers are located on a line joining the pivots at a location between these two pivots.

5. A junction between two members comprising a male part and a female part, each part being adapted for being carried by a respective one of the two members, the male part including a convex side and the female part including a rocking lever, a pivotally supported lever supporting said rocking lever, said rocking lever including a concave side corresponding in shape to the convex side of the male member for accommodating the same and elastic restoring means for said lever and said rocking lever urging the same to a normal position, said convex and concave sides being respectively positioned for being fitted together to close said junction, said junction being openable by pivotally moving the lever, the male part including a flat side opposite the convex side, the female part comprising a casing, said casing including a flat internal side opposite the concave side of said rocking lever, said casing including a pivot supporting said first lever, a second pivot carried by said lever and pivotally supporting the rocking lever, said casing being provided with a cut-out through which passes said second pivot, said elastic means comprising a spring fixed to the rocking lever, said second pivot being located on the first mentioned lever closer to the male member than is said pivot supporting the first mentioned lever.

6. A junction as claimed in claim 5, in which said female part comprises a cam rigidly fixed to the rocking lever, the first mentioned lever including a tail engaging said cam for opening said junction.

7. A junction as claimed in claim 5, in which said female part comprises a push-rod pivotally supported on the first said pivot and a cam fixed to said rocking lever, the push-rod engaging said cam for separating said junction.

8. A junction between two members comprising a male part and a female part, each part being adapted for being carried by a respective one of the two members, the male part including a convex side and the female part including a rocking lever, a pivotally supported lever supporting said rocking lever, said rocking lever including a concave side corresponding in shape to the convex side of the male member for accommodating the same and elastic restoring means for said lever and said rocking lever urging the same to a normal position, said convex and concave sides being respectively positioned for being fitted together to close said junction, said junction being openable by pivotally moving the lever, the male part including a flat side opposite said convex side, the female part comprising a casing, said casing including a flat internal side opposite the concave side of the rocking lever, said lever passing through the casing in a cut-out portion provided therein, and a circular slide supported on said lever for said rocking lever, said elastic means comprising a spring engaging said first lever and urging the same into abutment against said casing at said cut-out portion, and a second spring engaging the rocking lever and urging the same to a mean position with respect thereto, said slide being placed on the side of the female part closer to the male part than is the pivot of the first lever.

References Cited by the Examiner

UNITED STATES PATENTS 2,697,625   12/54   Krause _____ 292—304 X

M. HENSON WOOD, Jr., *Primary Examiner.*